(12) United States Patent
Kraft et al.

(10) Patent No.: US 6,832,239 B1
(45) Date of Patent: Dec. 14, 2004

(54) SYSTEMS FOR MANAGING NETWORK RESOURCES

(75) Inventors: Reiner Kraft, Gilroy, CA (US); Michael L. Emens, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 657 days.

(21) Appl. No.: 09/611,692

(22) Filed: Jul. 7, 2000

(51) Int. Cl.[7] .............................................. G06F 15/16
(52) U.S. Cl. ...................... 709/203; 709/217; 709/223
(58) Field of Search ................................ 709/203, 217, 709/223, 224

(56) References Cited

U.S. PATENT DOCUMENTS

| | | |
|---|---|---|
| 5,649,092 A | 7/1997 | Price et al. |
| 5,671,365 A | 9/1997 | Binford et al. |
| 5,699,518 A | 12/1997 | Held et al. |
| 5,706,507 A | 1/1998 | Schloss |
| 5,745,781 A | 4/1998 | Ekanadham et al. |
| 5,768,528 A * | 6/1998 | Stumm ....................... 709/231 |
| 5,835,727 A | 11/1998 | Wong et al. |
| 5,878,228 A * | 3/1999 | Miller et al. ................. 709/235 |
| 5,918,013 A | 6/1999 | Mighdoll et al. |
| 5,956,709 A | 9/1999 | Xue |

FOREIGN PATENT DOCUMENTS

| | | |
|---|---|---|
| EP | 0770965 A1 | 5/1997 |
| EP | 0935194 A2 | 8/1999 |
| JP | 10-177495 | 6/1998 |
| WO | WO 97/44747 | 11/1997 |

OTHER PUBLICATIONS

International Business Machines Corp., "Differentiated Service for Telnet 3270 Services", Research Disclosure, Jun. 1999 / 879, 422115.

International Business Machines Corp., "General Framework for Managing Bandwith Usage for Heterogeneous Units of Work for a Mobile Client", Research Disclosure, Oct. 1998 / 1389, 41478.

Himonas et al., "A Robust Real–Time Transport Protocol For Multimedia Information Retrieval in an ATM Network", IEEE International Performance, Computing and Communications Conference, 1997, pp. 177–183.

Abstract of Chen et al., "A Queueing Approach to the Performance Evaluation of DQDB", IEEE International Phoenix Conference on Computers and Communications, 1992, pp. 636–643.

Abstract of Abdelzaher et al., "Web Content Adaptation to Improve Server Overload Behavior", Computer Networks, May 1999, vol. 31, No. 11–16, pp. 1563–1577.

* cited by examiner

Primary Examiner—David Y. Eng
(74) Attorney, Agent, or Firm—Jon A. Gibbons; Fleit, Kain, Gibbons, Gutman, Bongini & Bianco P.L.

(57) ABSTRACT

One aspect of the invention is a system for managing a high volume of request reaching a file server which avoids slowing down of the request of all client computers. The system serves a limited number of clients at one time, and deploys an applet to other requesting clients which is programmed to check the server at a later time for availability, and through which a client user can be informed of estimated times to start and complete the download.

A second aspect of the invention is a system managing traffic through a gateway between an Intranet and the Internet which accepts web resource requests along with threshold time value. The system matches up requests for the same resource received from different clients, and issues a single request for the matched up requests. The threshold time values of the requests may correspond to off peak hours when the gateway's resources are not over utilized.

Methods and software for the systems are disclosed.

12 Claims, 16 Drawing Sheets

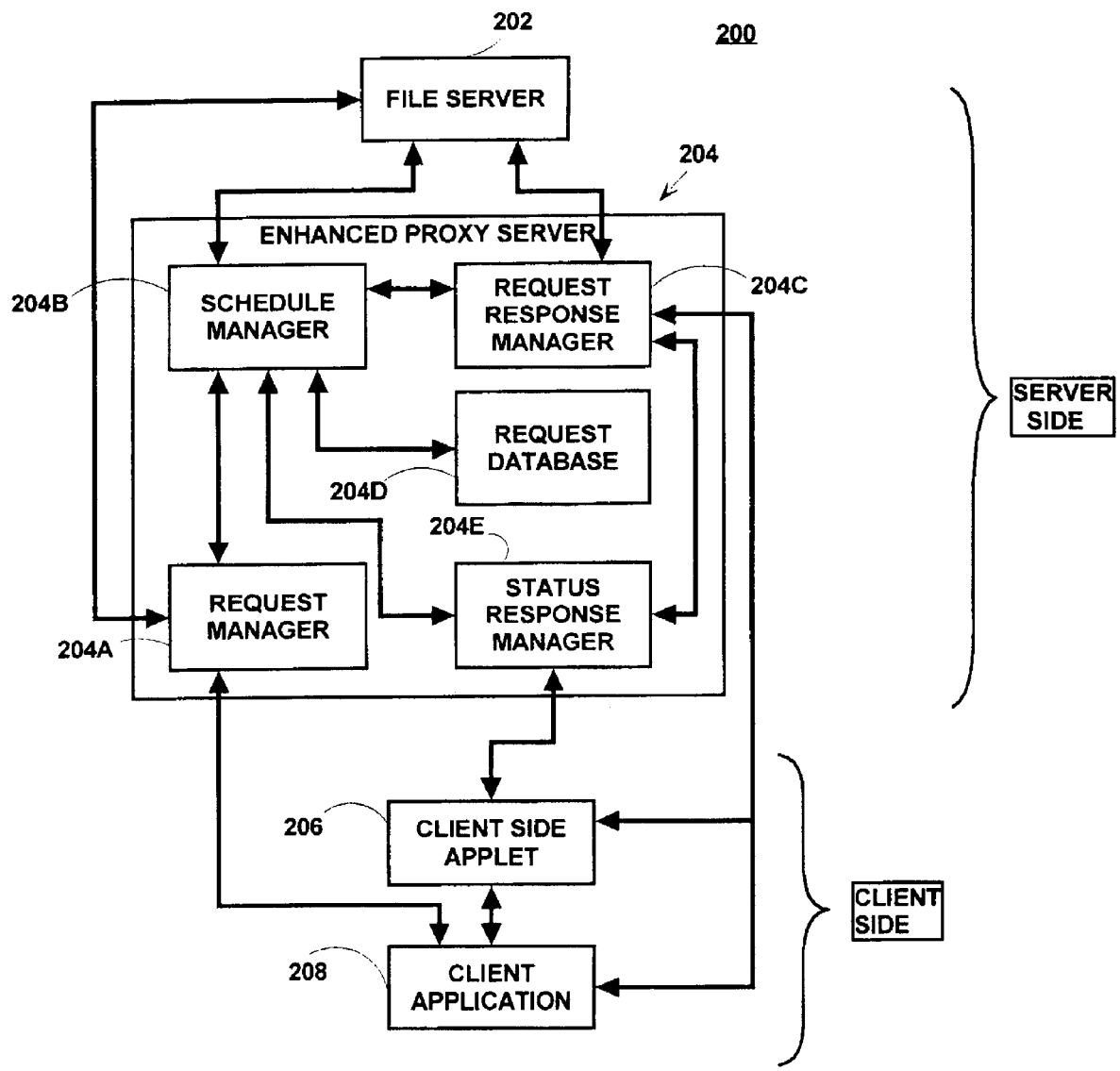

FIRST PROCESS OF SCHEDULE MANAGER

SECOND PROCESS OF SCHEDULE MANAGER
900

REQUEST MANAGER PROCESS

SYSTEMS FOR MANAGING NETWORK RESOURCES

PARTIAL WAIVER OF COPYRIGHT

All of the material in this patent application is subject to copyright protection under the copyright laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

CROSS-REFERENCE TO RELATED APPLICATIONS

Not Applicable

FIELD OF THE INVENTION

This invention is directed to client-server computing and more particularly to managing download requests over resource limited networks and resource limited gateways.

BACKGROUND OF THE INVENTION

The continued exponential growth of the Internet, has resulted in surges in demand for Internet resources (computing and communication, e.g., file serves) not anticipated by designers of Internet infrastructure. A familiar case in point is the situation of an Internet service providers (ISP) customer base growth outstripping its infrastructure (e.g., number of dial up servers, the bandwidth of its connection) development.

A surge in demand for Internet resources can also be an aperiodic event, such as the demand on the file servers of a software distributor triggered by the release of a much anticipated new application program. Such an aperiodic surge in demand may not justify investment in new file serves, and higher bandwidth connections since it may be an infrequent occurrence.

When a file server receives a request for a file, the file is broken up into a large number of pieces (e.g., datagrams) at one or another layer, (for example the transport control protocol TCP layer) of the communication protocol stack, and sent back to the requesting client. When, in the course of a surge in demand, the same file server receives a number of requests for one or more files from a number of different clients, the sending of pieces of the various requested files to the various requesting clients are interleaved in the time domain. And although client-server topologies are useful, they are not without their shortcomings.

One shortcoming with servers is that many times they are resource limited. For example, if the file server is overloaded, it's speed in servicing all the file requests will become the limiting factor (rather than the available bandwidth) in determining the time required to fulfill the file requests. Because of the interleaving of sending of pieces of different files in the time domain, a large number of users will experience an inordinately in extended download time. The time is inordinate in consideration of the file size and the limiting bandwidth of the connection between the file server and the requesting client.

Another shortcoming with client-server topologies, is that during an inordinately extended download client resources continue to be tied up in servicing the download, which is disadvantageous to the client user. The client user does not have positive information as to the server status, and can only infer from the delay in performing the download that some computer or communication resource involved in the download is at fault. Slow downloads and the lack of information for the client user as to the cause of the slowness may lead to increased client user anxiety, and dissatisfaction with the Internet experience. In an ecommerce application of the Internet uncertain delays in transferring files (e.g., recently released requests for quotations RFQ's) can have an adverse monetary impact.

Accordingly, a need exists to overcome the above shortcomings and to provide a system for efficiently managing the resources of a file server in order to obtain shortened download times and to provide client feedback of the server load status.

Another situation in which the rapid development of the Internet has created a situation in which certain resource (computing/communication) may lag in development and become limiting factors, is the case a firewall/proxy server software and hardware which serves as a gateway between an Intranet, and the Internet. Security rational suggests having a low number of gateways from Intranet to the Internet, to limit the avenues through which a security breach can be made. Having a lower number of gateways limits the available bandwidth for communication between the Intranet and the Internet according to the available processing power on the gateway computers for running the firewall/proxy server software.

One shortcoming with communication resources such as gateways is like servers, they have limited resources. In situations where one or more requests are made for the same network resource, gateways do not intelligently handle the duplicative requests. One example of typical duplicative requests is the use of web crawlers. Web crawlers are automated programs for obtaining files from the Internet. Like web browsers employed by human users, web crawlers issue Hyper Text Transfer Protocol (HTTP) requests for web documents, identified by a uniform resource identifier (URI). However due to there automated nature web crawlers, may place a high demand on gateway throughput capacity. Web crawlers may for example be employed to build indexes for search engines.

However, in contrast to a human users who expect real time response, HTTP requests issued by web crawlers are usually not considered so time sensitive.

Web crawlers and/or multiple or the same user using a web browser from an Intranet may repeatedly request the same web resource (identified by a Uniform Resource Identifier (URI)), in the course of some specified period of time. For example multiple instances of a web crawler performing a similar function from a companies Intranet may have the need to access the same resource repeatedly. The resource may be routinely accessed in the course of conducting the company's business. Each time the resource is needed, the request must be issued through the gateway, and separately consume a portion of the gateways bandwidth.

Accordingly, a need exists to overcome the problem of duplicative through a network resource with limited capacity such as a gateway. What is particularly needed is a system for avoiding overloading of communication resources by duplicative requests for Internet web resources.

SUMMARY OF THE INVENTION

Briefly, according to a first embodiment of the invention a computer network comprises a file server, a file server application installed on the file server a client computer, a client application installed on the client computer, a proxy server application installed on the file server, the proxy server application operative to receive a file request from the client application, send a client side applet to the client computer and send the client side applet information selected from a group of network resources consisting of a time to start a download of the file, a time to complete the download of the file, and a count of other file requests received by the file server.

Briefly, according to a second embodiment of the invention a system for managing es the available bandwidth through a gateway from one network to another comprises a plurality of client applications, a plurality of client side components which interoperate with the plurality of client applications, each client side component being operative to receive information resource requests from the client applications, to read a corresponding threshold time value, and to send the information resource request and the corresponding threshold time value to a proxy server component, the proxy server component operative to receive a plurality of information resource requests, and corresponding threshold time values from the plurality of client side components, to match up a group of information resource requests according to a resource identification included in each resource request, to derive a group threshold value for the group, and to issue a single resource request corresponding to the group of information resource requests.

In alternate embodiments, methods and computer readable media are disclosed to carry out the above system.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings.

FIG. 2 is a representation of software interrelationship according to an embodiment of the present invention.

DETAILED DESCRIPTION OF THE PREFERRED EMBODIMENTS

It should be understood that the following embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality.

Exemplary Network

Figure 1:
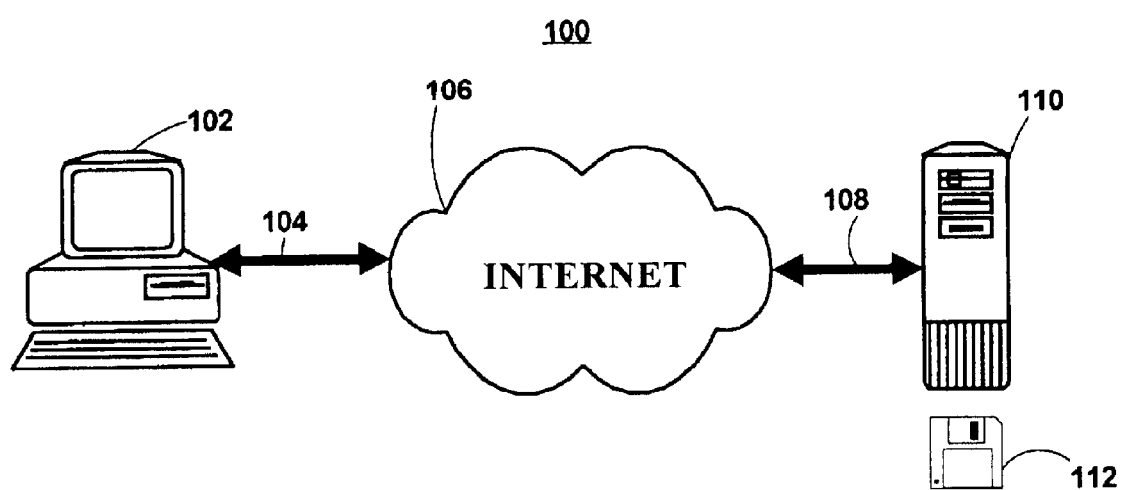
FIG. 1 is a schematic of a computer system used in practicing an embodiment of the invention.

Referring to FIG. 1 a schematic 100 of a computer system used in practicing an embodiment of the invention is shown. A client computer 102 is connected to the Internet 106 through a bidirectional data link 104. A file server 110 is connected to the Internet 106 through a second bidirectional data link 108. Bidirectional data links 104, 108 may for an example take the form of a Digital Subscriber Lines (DSL) connections to Internet gateway computers, e.g., Internet service provider (ISP) computers not shown.

Diskette 112 is provided for loading software onto the file server computer 110 to configure it to carry out the inventive process which will be described below. According to an embodiment of the invention the software loaded onto file server computer 110 includes an applet which is transported over the Internet to the client computer 102. The applet runs on the client computer 102, e.g., within a browser on the client computer 102, and interoperates with software components from diskette 112 running on the file server computer. In lieu of a diskette, the software may be loaded from another type of source.

Exemplary Functional Block Diagram of Various Software Components According to an Embodiment of the Invention Referring to FIG. 2, a representation of software interrelationship 200 according to an embodiment of the invention is shown. Referring to FIG. 2, a file server application 202, an enhanced proxy server application 204, a client side applet 206, and a client application 208 are shown. The client side applet 206 is sent to a client computer 102 which requests a file by the enhanced proxy server application 204 under conditions that will be described in further detail below. The client application 208 is preferably a web browser, and the client side applet 206 is preferably a Java applet which runs from within the web browser.

The file server application 202, and the enhanced proxy server 204 may be run on at a single server computer, e.g., 110. In the case of higher capacity systems the server side applications may be distributed on a server local area network (LAN) connected to the Internet through a gateway.

In the latter case the computer on which the file server application 202 and the enhanced proxy server application 204 are run may be distinct.

The proxy server application 204 comprises a number of modules. The proxy server application 204 is preferably written in an object oriented programming language such as the Java programming language developed by Sun Microsystems of Palo Alto, Calif. In the latter case the various enumerated modules, described below could take the form of a number of separate classes.

In FIG. 2 the enhanced proxy server 204 modules are denoted 204X where X is a roman letter.

A request manager 204A receives initial requests for resources such as files from a client application 208.

The request manager can invoke a schedule manager module 204B. The schedule manager module 204B maintains records of download requests from clients in a request database 204D. The records include identification of the requested resource, the time of the request, and optionally the size of the file requested. The format of the identification may be the Uniform Resource identifier (URI) used for World Wide Web (WWW) resources. The size of the file may be obtained by the schedule manager 204B as needed from the file server by examining file headers or directory information related to the requested files. The latter might be accomplished with operating system commands or by a network protocol command in the case of one or more enhanced proxy server computers accessing multiple file server machines in a server farm. The schedule manager module 204B is capable of invoking a request response manager 204B to transmit responses to the client application 208, e.g., a browser, and to a client side applet 206.

A status response manager 204E receives a follow up messages from the client side applet 206 pursuant to requests submitted by the client application 208, and responds to those messages. The status response manager 204E can call the schedule manager 204B through which information in the request database 204D can be accessed. The status response manager 204E can then respond to the client side applets based on information retrieved from the request database 204D.

The request manager 204A, schedule manager 204B, and request response manager 204C, interact with the file server 202. The functioning of the enhanced proxy server will be described below with reference to flow diagrams shown in the FIGS.

Exemplary Method for Managing the Resources of a Sometimes Overloaded File Server Referring to FIGS. 3A–3D a flow diagram of a method for managing the resources of a sometimes overloaded file server is shown. The process shown in FIGS. 3A–3D can be carried out using the enhanced proxy server structured as shown in FIG. 2. References will be made in the description of the process shown in FIGS. 3A–3D to various software modules shown in FIG. 2. The software organization depicted in FIG. 2 is one contemplated by the inventors, and it should be understood that FIG. 2 merely represents one possible software design, and should not be construed as limiting of the invention.

Figure 3A:
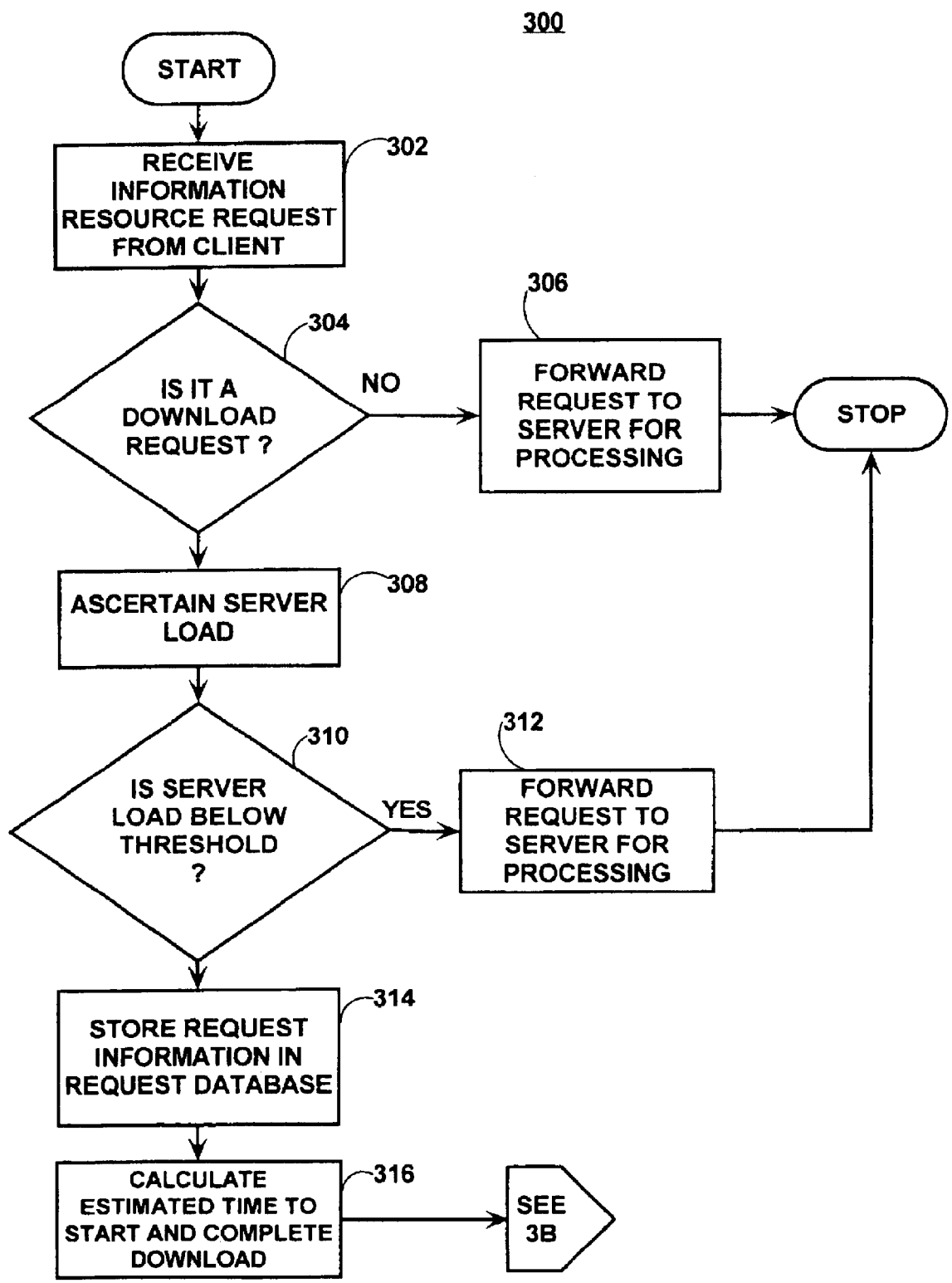
FIG. 3A is a first part of flow diagram of process for managing the resources of a file server computer according to an embodiment of the invention.

Referring to FIG. 3A in particular, in process block 302 a request for an information resource, identified by a URI, is received from a client application, 208, by request manager 204A. Note that at this stage in the process client side applet 206 will not yet have been deployed.

Note that the file server application 204, may serve large files, such as multimedia files, and also smaller files such as web pages containing links to the large files. The requests for large files are termed download requests. In process block 304, the request manager 204A determines if the request is for a large file download or for a smaller size resource. This may be done by accessing file size information in the directory tree data structure or file header on the file server 110, and comparing the file size to a predetermined limit value. The determination could alternatively be made on the basis of the file extension of the file pointed to by the URI. The request manager may access one or more lists of file types corresponding to what are considered large and/or small file types. For example '. wav' files (audio) could be included in the large category whereas .html (web page files) might be included in the small file category. If the request is not determined to be for a large download, then the process continues with process block 306, in which the request is forwarded directly to the file server 202 for processing.

If in process block 304, it is determined that the request is in fact a request for a large file download, then the process continues with process block 308 in which the current server load is determined. The current server load may be found querying the request database 204E, through the schedule manager module which maintains it. In process block 310 the measure of the server load obtained in the preceding process block 308, is compared to a predetermined threshold value. The threshold value is chosen by the software designers to correspond to a level of server load at which users accessing the server obtain what is deemed acceptable download performance. The choice of a threshold value consistent with acceptable download performance will depend on the processing power of the server computer, and the bandwidth of its connection to the Internet.

If in process block 310, it is determined that the server load is below the predetermined threshold value, then in process block 312 the request response manager 204C is invoked to establish connections between the enhanced proxy server application 204 and the file server application 202 and the client application 208, and to service the request immediately.

If the current server load exceeds the threshold value, then the request will not be serviced immediately, as doing so, would lead to an undesirably extended download time for the new requesting client, and would also slow down the downloads currently taking place, due to the fact that the server would be interleaving in the time domain transmission of datagrams to all of the requesting clients.

If in process block 310, it is determined that the current server load exceeds the predetermined threshold value, then in process block 314 the information related to the request including identification of the request, e.g., by URI, identification of the requesting client, e.g., by Internet Protocol (IP) address, and the time at which the request was made is stored the request database 204D.

Rather than servicing the request immediately, the user of the client computer will be informed of an estimated time until their requested download can be started and completed.

In process block 316, the time until the requested download can be started and completed is calculated by the schedule manager. In doing so, the schedule manager uses information from the request database on the downloads currently taking place, and information from the request database on other prior download requests which preceded the current download request, but for which the downloads have not yet been started. Based on the size of the downloads their start times which may stored in the request database, the estimated start and completion time for the new request can be determined. For example the sum of the outstanding bytes to be downloaded can be divided by an estimate of the total bandwidth available to the file server. In obtaining a term in the sum corresponding to currently ongoing downloads the time that the download started, in addition to the size of the file, can be used to estimate the remaining bytes. Both items of information can be stored in the request database.

Note that the bandwidth available to the file server may vary according to the status of the bidirectional data link 108 connecting it to the Internet. Communication Application Protocol Interfaces (API) may also be used to assess to current available bandwidth. The methods of the communication API will vary from one environment to another.

Figure 3B:
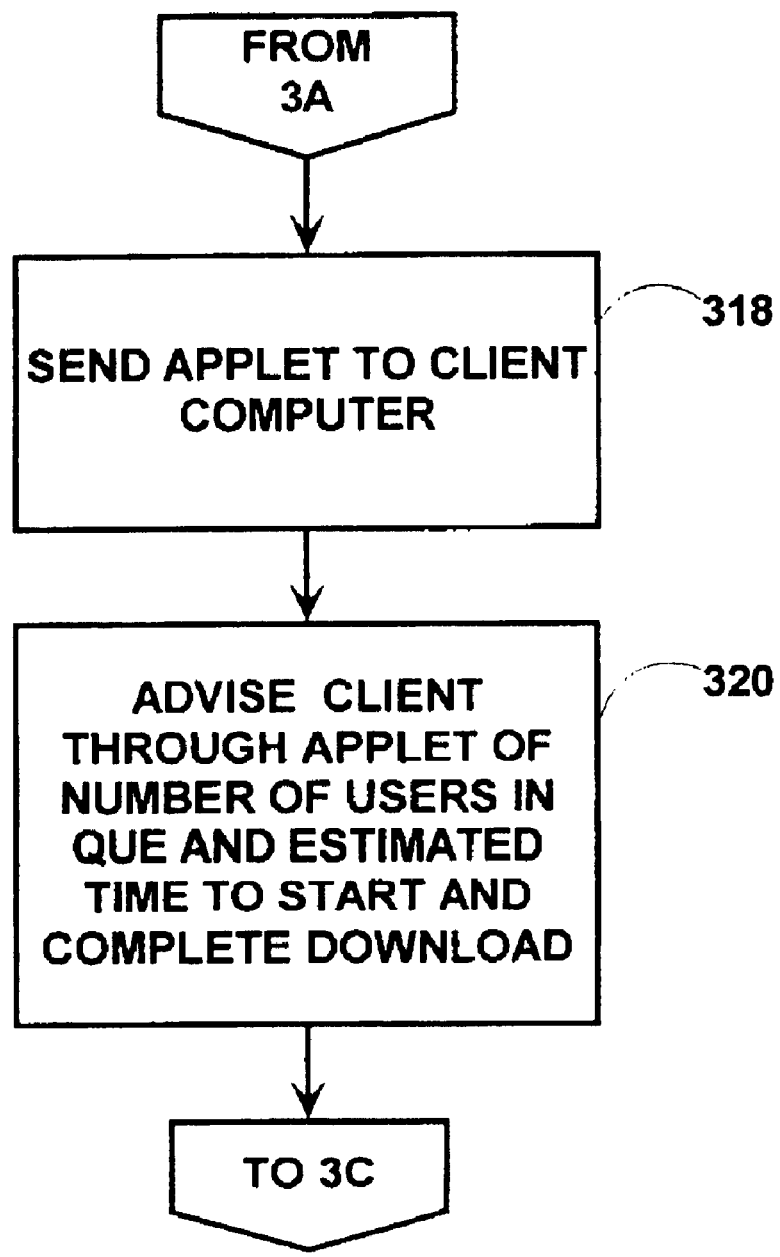
FIG. 3B is a continuation of the flow diagram shown in FIG. 3A.

Referring to FIG. 3B, in process block 318 the request manager sends the client side applet 206 to the client computer 102. The applet will then execute on the client computer 102.

In process block 320, the request response manager 204C informs the client user through the client applet 206 of the number of other requesting clients already awaiting service, and the estimated times until the download can be started and until it can be completed. The client applet 206 upon receiving the information may generate a display of the information in the main window or a separate window of the client application 208 e.g., web browser.

Upon receiving the information the user may choose to stay at the site and wait for the download or to leave the site and abort the download. The inventive system has an advantage over the prior art, that even if the wait is very long due to heavy server load, the user is, at least, informed of the length of the wait that can be expected. More importantly, the client computer will use less resource to run the applet 206 during the waiting period than it would to handle a slow download. The waiting applet 206 essentially goes in t a "sleep" mode and thus utilizes only very few resources. It is important to note that a slow download would consume more resources than an applet 206 in sleep mode. Continuing on, knowing an estimated time until the requested download will start, the client user can open up another browser window and do other work on the web in the interim.

The applet 206 is programmed to periodically send a message to the status response manager 204E requesting updated status information. The status response manager 204E calls the schedule manager 204B to calculate new values for the number of other clients ahead of the requesting client applet, the estimated time until the download will begin, and the estimated time to complete the requested download. This information will then be passed back to the client applet 206 by the status response manager 204E.

Figure 3C:
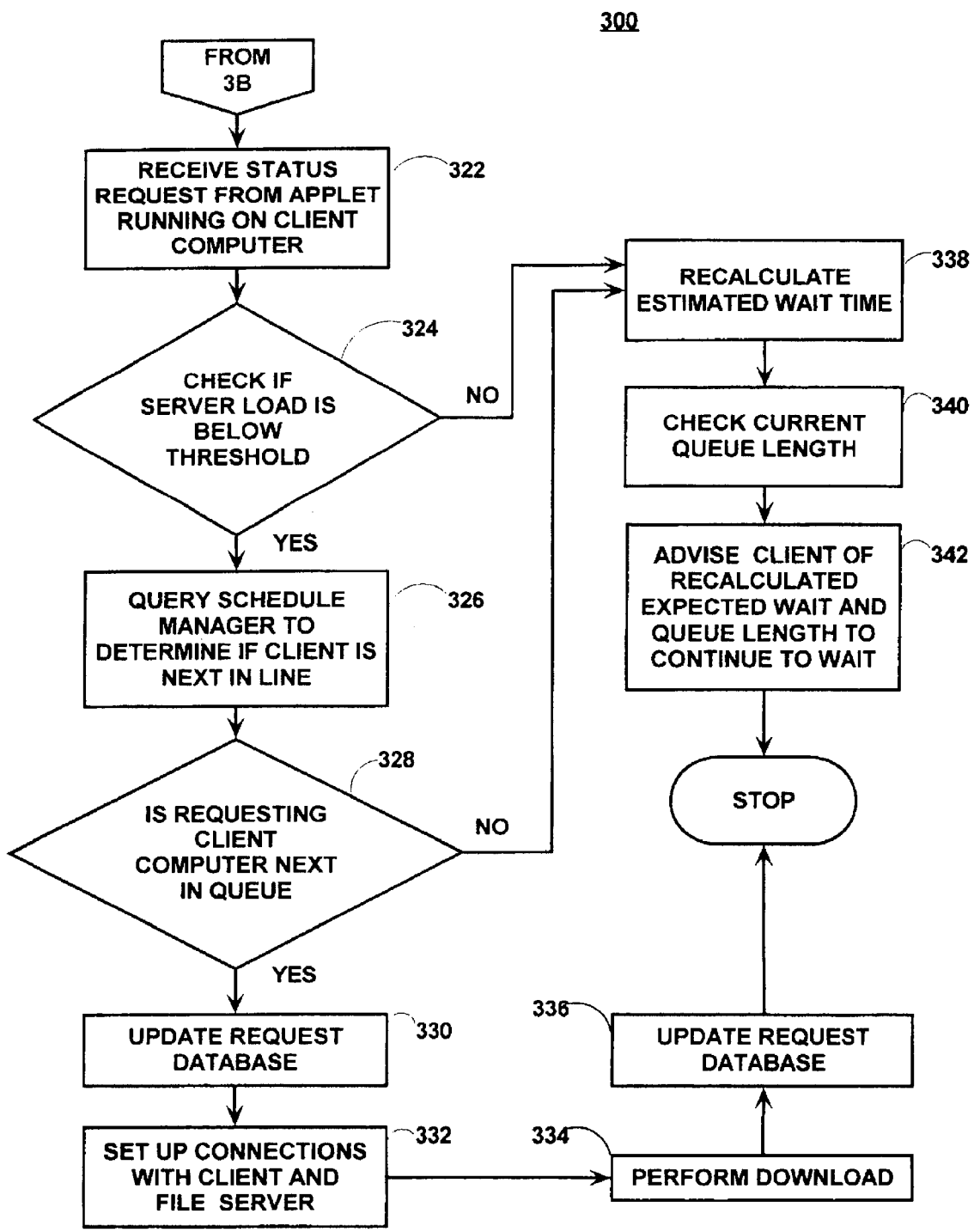
FIG. 3C is a continuation of the flow diagram shown in FIG. 3B.

Referring to FIG. 3C, in process block 322 a status request is received from an applet 206 running on a client computer 102. Process block 324 is a decision block in which it is determined, if the server load is below threshold. If the server load is now below threshold, then the process continues with process block 326 in which, the schedule manager 204B is queried in order to determine if the client associated with the requesting applet is next in a queue of clients awaiting service. The queue referred to here is not necessary a memory structure in form of an ordered list, rather it may be an ordering inferred from the information stored in the request database such as the time of each request. In processing the query, the schedule manager 204B, accesses the request database 204D. Process block 328 is a decision block, the outcome of which depends on the information obtained in process block 326. In process block 328 it is determined whether the requesting client computer is the next computer in the queue to be served. If the requesting computer is next in the queue then in process block 330 the schedule manager 204B is called to update the request database to reflect that the download to the client has started. The start time may be recorded. In process block 332 connections are set up between enhanced proxy server 204, the client 208 and the file server 202. The request response manager 204C is called by the status response manager 204E to setup the aforementioned connections. In process block 334 the download is performed. In process block 336 the request database 204C is updated again to reflect that the download has been performed. This update could be the deletion of the record of the request from the request database 204C.

If in decision block 324 it is determined that the server load is not below threshold, then the process continues with process block 338. Likewise if it is determined in decision block 326, that the requesting client computer is not the next client in the queue then the process continues with process block 338. In process block 338 the estimated wait time for the requesting client is recalculated, by the schedule manager 204B based on information (e.g., time, and size) of other outstanding requests of stored in the request database 204D. In process block 340 a count of the number of clients in the queue ahead of the requesting client is obtained by the schedule manager 204B. In process block 342, based on the information obtained in the preceding two process blocks, the requesting client is given an updated report of the measure of the availability of network resources including a time to start a download of the file, a time to complete the download of the file, an expected wait time to begin and complete the requested download. It is important to note that the measure of the availability of the network resources can be any combination of one or more of the above measurements of network resources including a start time, a download time or a count of prior requests. The requesting client is also given an updated report of the number of other clients to be serviced before the requesting client is serviced.

Exemplary Applet Process Used in Conjunction With the Server Side Process Depicted in FIGS. 3A–3C FIG. 4 shows a flow diagram 400 of a process carried out by an applet which works in coordination with the enhanced proxy server 204 is shown. The applet is sent by the request response manager 204C to the client computer 102 in process block 318.

Figure 4:
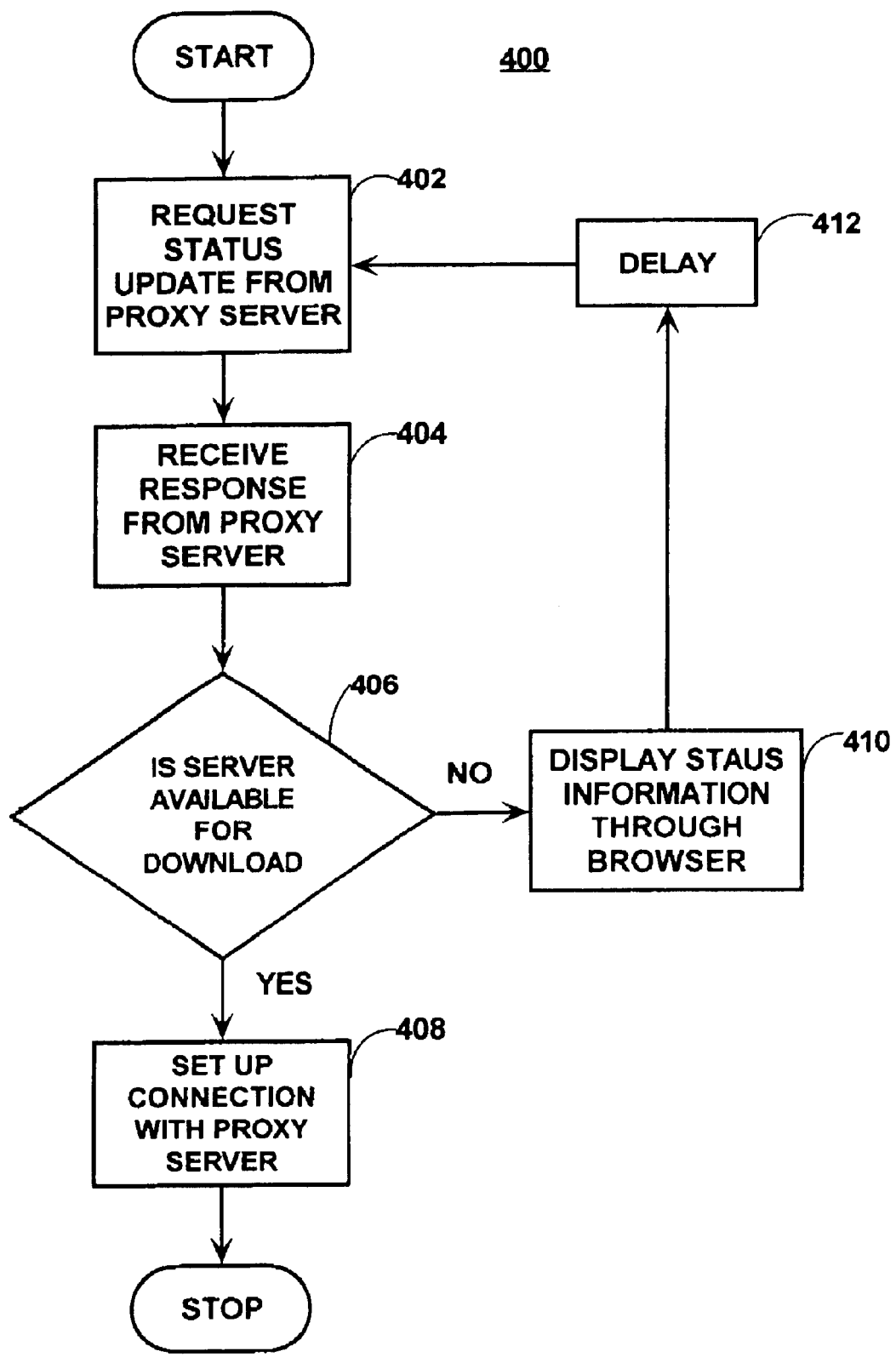
FIG. 4 is a flow diagram of a process of a client side applet that interoperates with the server side process depicted in FIGS. 3A–3C.

Referring to FIG. 4, in process block 402, the applet sends a request to the status response manager module 204E. In process block 404 the applet receives a response to its status request. Process block 406 is a decision block, the outcome of which depends on whether according to the response received in the preceding process block, the server is available to initiate the download to the client associated with the requesting applet. If the server is available to perform the download (i.e. if the outcome decision blocks 324 and 328 on the server side are affirmative), then in process block 408, the applet 206 coordinates with the client 208 and the request response manager 204C in setting up a connection. This is the connection between the client and the enhanced proxy server mentioned in connection with process block 332, FIG. 3 of the server side process.

If in process block 406, it is determined based on the information received in the preceding process block 404, that the server is not ready to perform the download, then information received in the response from the proxy server in process block 404, i.e. information sent to the applet in process block 338, FIG. 3 of the server side process is output to the user. The output can for example be presented through a client application (web browser) 208 window. Then, after a delay 412, the applet will loop back to process block 402 and issue another status request to the status response manager 204E. The length of the delay could be set in accordance with the estimated time until the enhanced proxy server 20 expects to be ready to perform the download as reported in process block 342 and received by the applet 206 in process block 404. Alternatively, the delay could be a preprogrammed period.

Exemplary Network

Figure 5:
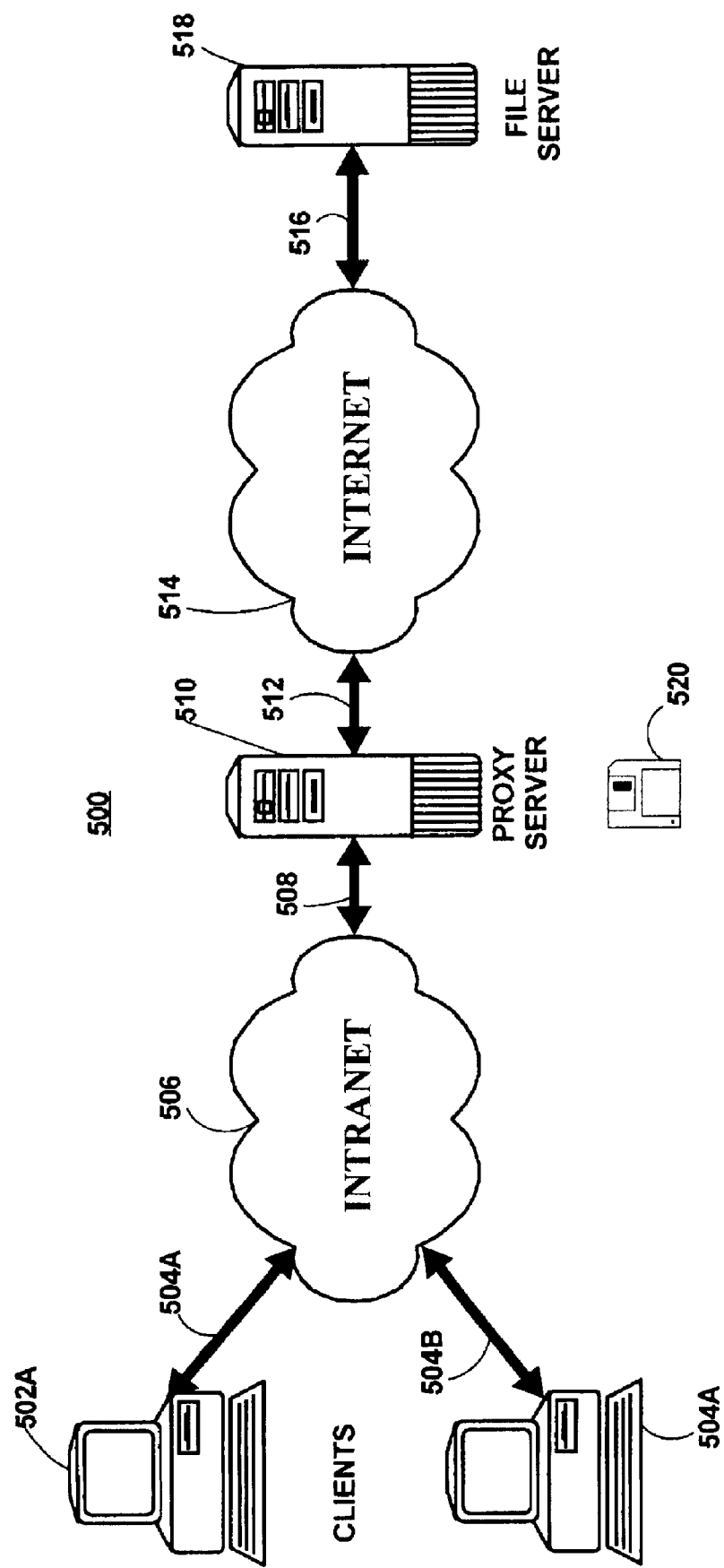
FIG. 5 is a schematic of a computer system used in practicing a further embodiment of the invention.

Referring to FIG. 5, an exemplary network 500 according to a further embodiment of the invention is shown. First 502A and second 502B client computers are connected to an Intranet 506 by first 504A and second 504B bidirectional data links respectively. A A proxy server 510 which serves as a gateway to the Internet 514 and a firewall between the Intranet 506, and the Internet 514 is provided. The proxy server 510 is connected to the Intranet 506 through a third bidirectional data link 508. The three aforementioned ail bidirectional data links 504A, 504B and 508 could for example comprise ethernet data links.

As mentioned above, in the interest of security, it is desirable to limit the number of gateways, for example to one, between the Intranet 506 and the Internet. However, limiting the number of gateways has the disadvantage of limiting the bandwidth of the data pathway between the Intranet 506 and the Internet 514.

The proxy server 510 is connected to the Internet 514 through a forth bidirectional data link 512. A file server 518 is connected to the Internet through a fifth bidirectional data link 516. The latter two bidirectional data links may for example comprise high speed connections such as T1 lines or Digital Subscriber DSL lines.

Figure 6:
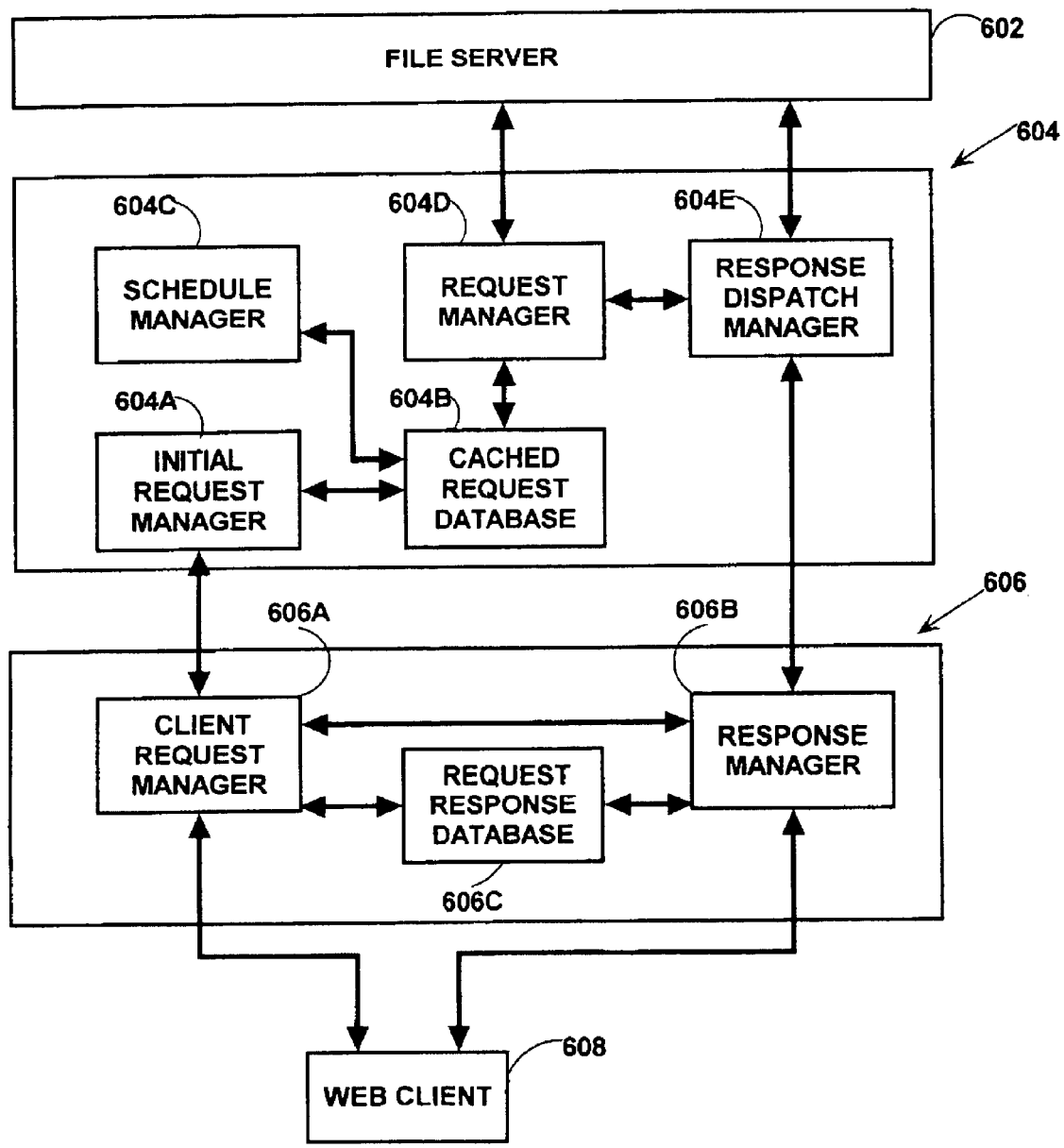
FIG. 6 is a representation of software interrelationship according to a further embodiment of the present invention.

Exemplary Software Schematic According to a Preferred Embodiment of the Invention Referring to FIG. 6 a schematic 600 of software interrelationships according to a further embodiment of the invention is shown. The network illustrated in FIG. 5 is suitable for use with the software arrangement shown in FIG. 6. One function of the software shown in FIG. 6 is to efficiently manager the finite bandwidth through proxy server 510. It is important to note that the bandwidth through the proxy server 510, the limit may be set not by speed of data link 508 or 512, but by the processing power of the proxy server.

The software illustrated in FIG. 6 serves, according to the instant embodiment, to manage requests for network resources, (e.g. files, for example data, video) made by one or more web clients 608 (one shown) to one or more file servers 602 (one shown).

The software comprises a client side component 606, which can run on the same client computer 502A or 502B as the web client 608 with which it interoperates. The A software also comprises a proxy server component 604, which runs on proxy server 510.

The client side component 606 comprises three modules the functioning of which will be briefly described presently, and described in further detail below with reference to flow diagrams. The clients side component comprises a client request manager 606A and at response manager 606B.

The client request manager 606A receives Internet directed information resource requests, for example World Wide Web (WWW) directed, Hypertext Transfer Protocol (HTTP) GET requests from web clients 608. The client request manager 606A also reads in a time threshold value. The time threshold value may be read from a data structure maintained by the client request manager 606A. Alternatively in the case of a web browser client (as opposed to an automated web crawler) the request manager may generate a dialog box in response to each GET request for accepting specification of the threshold time value from the user. The client request manager 606A will format the GET request and the time threshold value into a single data structure which will then be forwarded to the proxy server component 604. The GET request which includes the HTTP token "GET", the URI of the requested resource, and an HTTP version number may be encapsulated with the threshold time value according to the Simple Object Access Protocol (SOAP) for transmission from the client request manager 606A to the initial request manager 604A. SOAP is a formatting standard built upon the Extensible Markup Language (XML).

The request manager 606A also records the GET request including the threshold time value in a client side request response database 606C.

The response manager 606B is responsible for receiving responses to the GET requests forwarded by the client request manager 606A, from the proxy server component request manager 604. The response manager also periodically or continually checks records in the request response database to ensure that the receipt of response to each GET request is not overdue. If it is, an error message is sent to the client.

The client side component 606 may provide an API through which web clients can access communication resource in the communication protocol stack.

The proxy server component 604 comprises a number of modules the functioning of which will be briefly described presently, and described further below with reference to flow diagrams shown in the FIGS. The modules of the proxy server component are at denoted 604X, where X is a letter. An initial request manager 604A is responsible for receiving requests from the client request manager 606A. The initial request manager 604A will then parse the received requests to separate out the GET request and the threshold time value, and store the values in a record in a cached request database 604B. The record in the cached request database 604B will include a status field. The status field has one of the following values:

status A=New request pending matching;
status B=matched request pending scheduling;
status C=scheduled request pending send message; and
status D=sent request and waiting for response.

The status field is initially set to status A. The changing of the status throughout the process performed by the proxy server component 604 will be discussed further below.

A schedule manager 604C performs two functions. The first function is compare the URI in each GET request of each newly received (status A) request to other request records in the cached request database. To do so the schedule manager 604C is repeatedly accessing the cached request database 604B to check for matches. When request records with matching URI are found, the database is updated to reflect the match between the two or more records. This can be done by setting a match field in each record matched by URI to a preselected sequence number. More generally the matching records will be grouped in some way in the cached request database. The URI field itself can be used as a primary key in the database to select matching records. The effective time threshold values for all the matching request records will then be set to the same value. Preferably they will be set to the minimum of the threshold time values of the group, in order that all request will be completed by their respective threshold time values. The database 604B update of the threshold time values could be carried out by finding the minimum threshold time value within the matching group, and overwriting the time values of all the records with the minimum threshold time value. Once the new request is checked against other records in the cached request database 604B for matches its status is changed to status B=matched request pending scheduling.

The second function performed by the schedule manager 604C is to continually check the cached request database 604B (e.g., every preselected interval) and compare the current time to the threshold time value for each request or each group of requests in the case of matching groups in the cached request database 604B. If a request or group of request is found for which the current time exceeds the threshold time value, the status of the request or group of requests is changed to status C=scheduled request pending send message.

A request manager 604D continually (e.g., every preselected interval) checks the cached request database 604B for status C records. When a status C record is found the GET request for the record is issued to file server 602 indicated by the URI of the GET request. The request manager will also instantiate a response dispatch manager 604E.

The response dispatch manager 604E is responsible for waiting for responses from the file server 602 to the GET. The response dispatch manager 604E will be initialized 604E with the current time. If a response to the GET is not received within a predetermined time period. The GET request will be considered to have failed. In the case of failure or if the proper response to the GET is received from the file server the response dispatch manager will open a connection to the to the client side response manager 606B associated with an individual unmatched GET or with each response manager 606B associated with matched GET request. The response dispatch manager 604E will then forward to each response manager 606B an HTTP error message in the case of failure, or the proper response, e.g. the web resource, in the case of a successful GET request. The response manager 606B will in turn forward the response to the associated web client 608.

Thus the enhanced proxy server application 604 makes for more efficient use of the finite available bandwidth through the proxy server in at least the following two ways:

1. The enhanced proxy server accepts a threshold time value for performing the download which can desirably be set to correspond to off peak, non business hours when the traffic through the proxy server is greatly reduced due to absence of real time human users;
2. Multiple requests for the same resource will result in one download from the designated source file server rather than multiple redundant requests.

Flow Diagram for Initial Request Manager

Figure 7:
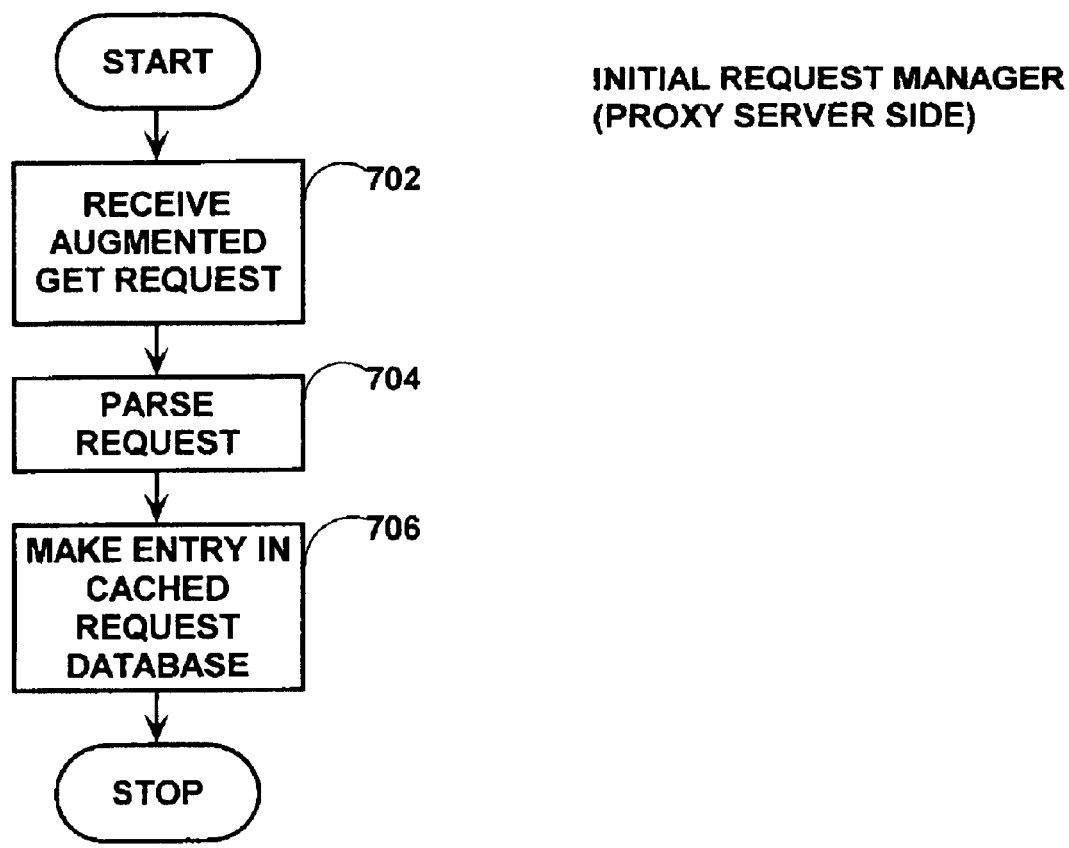
FIG. 7 is a flow diagram of process carried out by a software module according to an embodiment of the invention.

Referring to FIG. 7 a flow diagram for a process 700 carried out by the initial request manager 604A is shown. In process block 702, an augmented GET request including a standard HTTP GET request, and a threshold time value are received by the initial request manager 604A. As mentioned above the augmented GET request can be encapsulated as a SOAP message. The threshold time value may correspond to an absolute time or a delay period which the initial request manager 604A adds to the current time. In the context of an object oriented programming language, the threshold time value may be an instance field of an object. The threshold time value may be represented by more than one parameter for example the three parameters hours, minutes, and seconds.

In process block 704, the augmented get request is parsed. In process block 706 an entry is made in the cached request database 604B based on information extracted from the received augmented GET request.

Flow Diagram for a First Process Performed by a Schedule Manager

Figure 8:
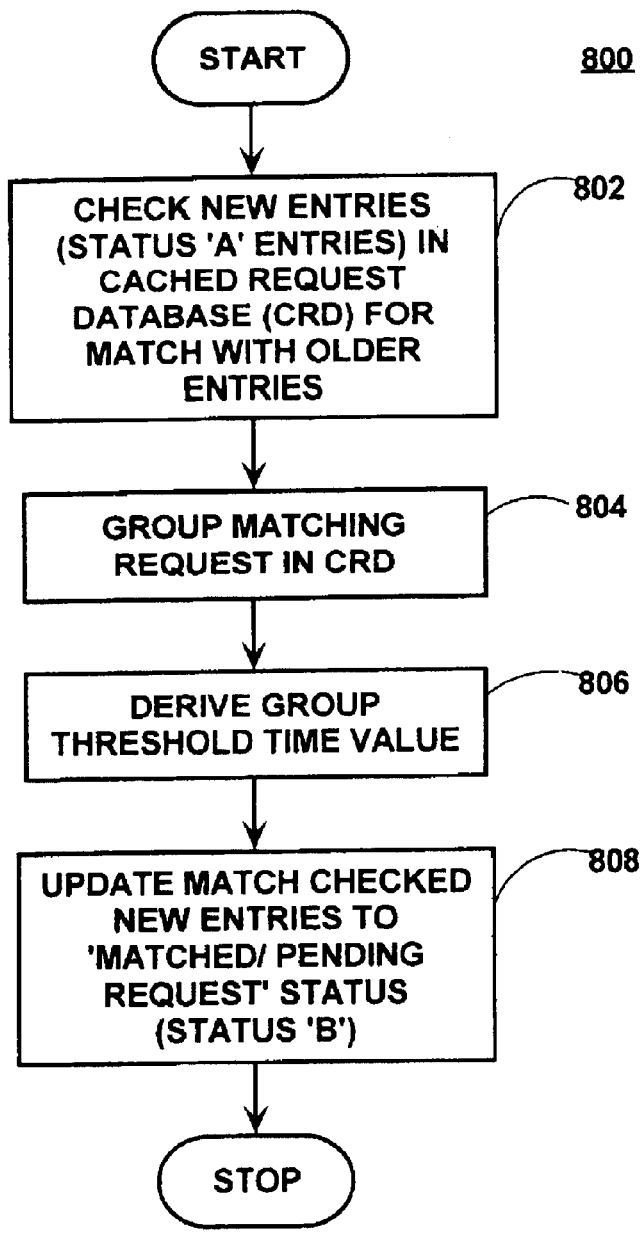
FIG. 8 is a flow diagram of process carried out by a software module according to an embodiment of the invention.

Referring to FIG. 8, a flow diagram 800 of a first process carried out by the schedule manager 604C is shown. In process block 802 new, status A entries are checked for match by URI against other records in the cached request database 604B. In process block 804 matched records are grouped together in the cached request database 604B. This may be accomplished by querying the cached request database 604B by resource identifier (URI) to find status B entries having the same resource identifier. In one embodiment, the cached request database 604B uses the URI as the primary key.

In process block 806 a group threshold time value is derived for each matched group of entries. The group threshold time value is preferably derived by taking the minimum of the threshold time values of the records in the group. The value is subject to change. If a new request is added to the cached request database 604B, and is matched to a preexisting group, and has a lower threshold time value than the previous minimum, then it's threshold time value will become the new threshold time value. This process can repeat as new matching requests are added to the cached request database 604B until the current time equals the threshold time value, at which point the a GET request will be issued for the group and it's status changed.

In process block 808 the match checked new entries are updated to status B.

Essentially, according to an embodiment invention, the proxy server component receives GET request along with a threshold time value. Any other request received after the first but before the threshold time value applicable to it will be grouped with it, and the proxy server will only need to send out one GET request to the file server 602 indicated in the matching GET requests.

Flow Diagram for a Second Process Performed by a Schedule Manager

Figure 9:
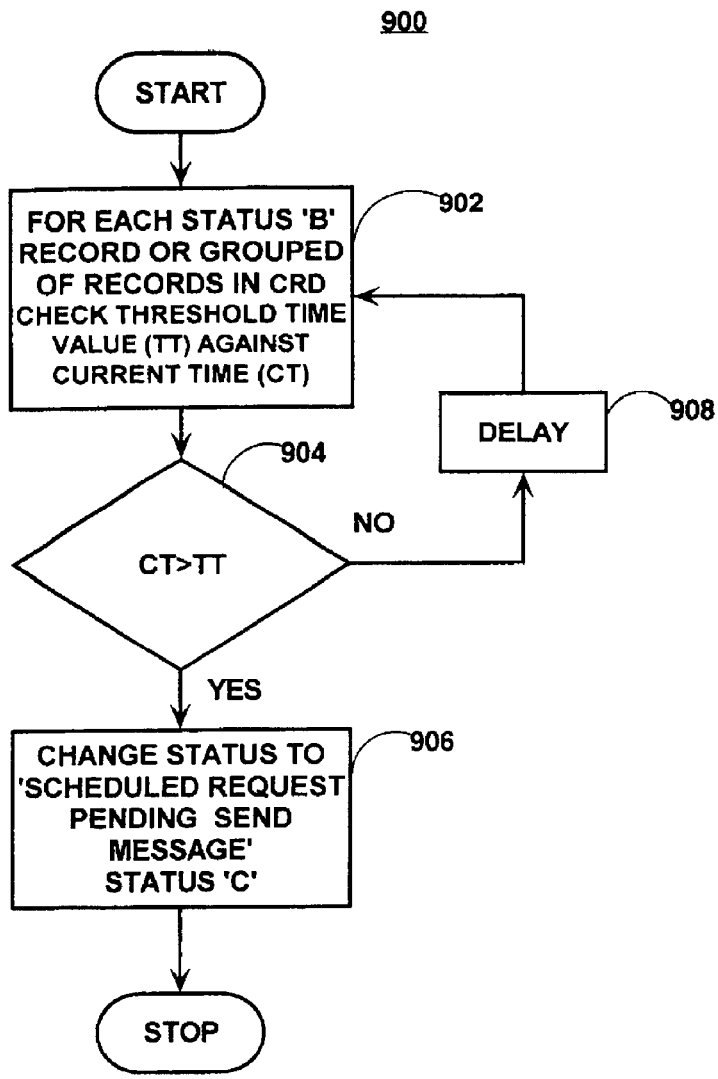
FIG. 9 is a flow diagram of process carried out by a software module according to an embodiment of the invention.

Referring to FIG. 9 a flow diagram 900 of a second process carried out by a schedule manager 604C is shown. In process block 902 for each status B record or set of grouped records in the cached request database 604B, the threshold time value is checked against the current time. Process block 904 is a decision block, the outcome of which depends on a comparison between the threshold time value, and the current time. If in decision block 904 it is determined that the current time exceeds the threshold time value, then the process 900 continues with process block 906. In process block 906 the status of the record or set of grouped records is changed to status C. If in process block 904 it is determined that the threshold time value exceeds the current time, the process loops back to process block 902, after a delay 908.

Flow Diagram for a Process Performed by a Request Manager

Figure 10:
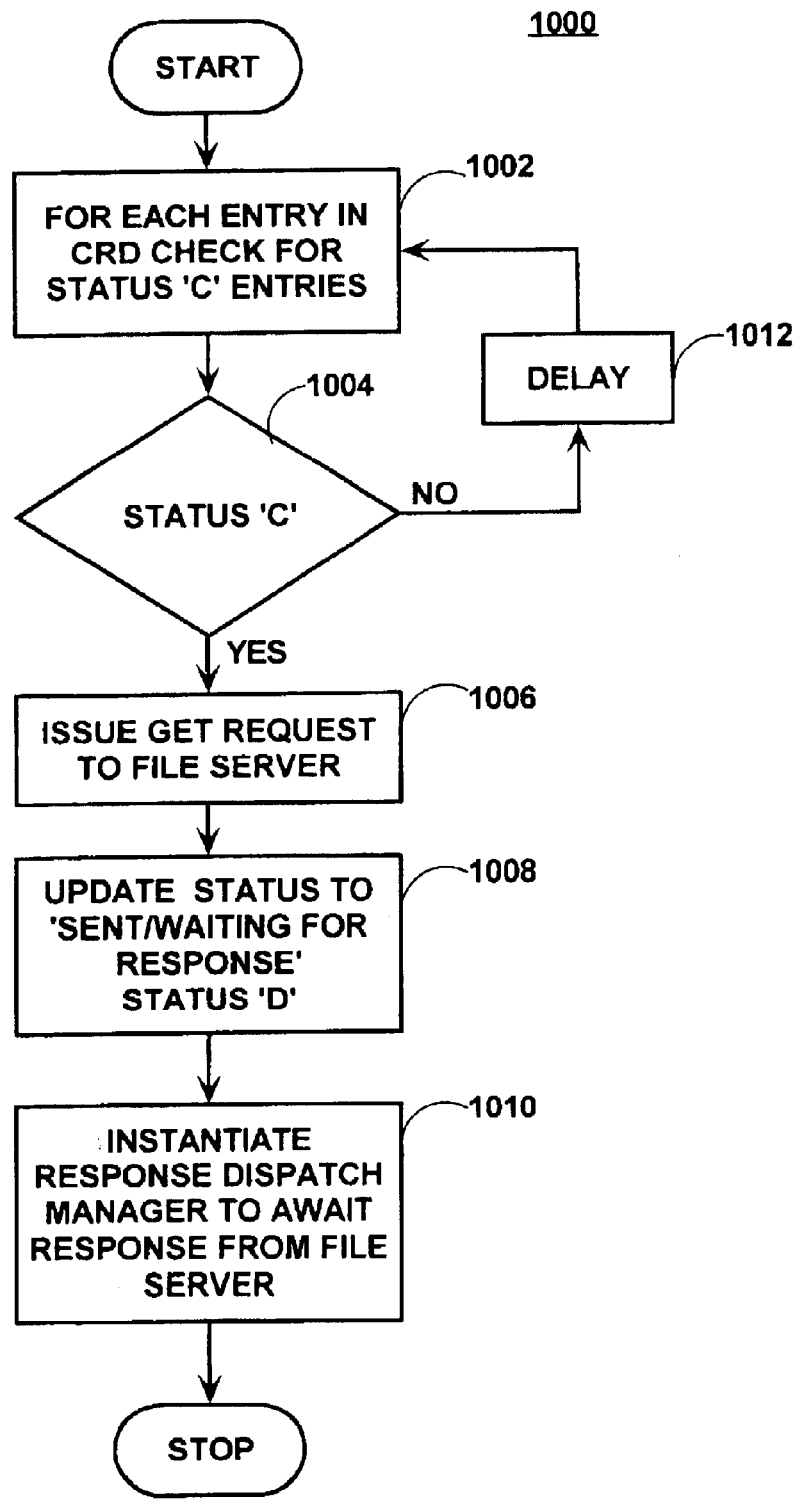
FIG. 10 is a flow diagram of process carried out by a software module according to an embodiment of the invention.

Referring to FIG. 10 a flow diagram 1000 of a process performed by a request manager 604D is shown. In process block 1002 for each record in the cached request database, the entry is checked to see if it is a status C record. Process block 1004 is a decision block, the outcome of which depends on whether a record is found to be status C. If not, the process loops back after a delay 1012 to process block 1002. If a status C entry is detected, then the process continues from decision block 1004 with process block 1006 in which the GET request of the status C record is sent by the request manager 604D to the file server 602 indicated in the GET request. In process block 1008 the status C record is updated to status D. In process block 1010 the response dispatch manager 604E is instantiated to await the response from the file server 602.

Flow Diagram for a Process Performed by a Response Dispatch Manager

Figure 11:
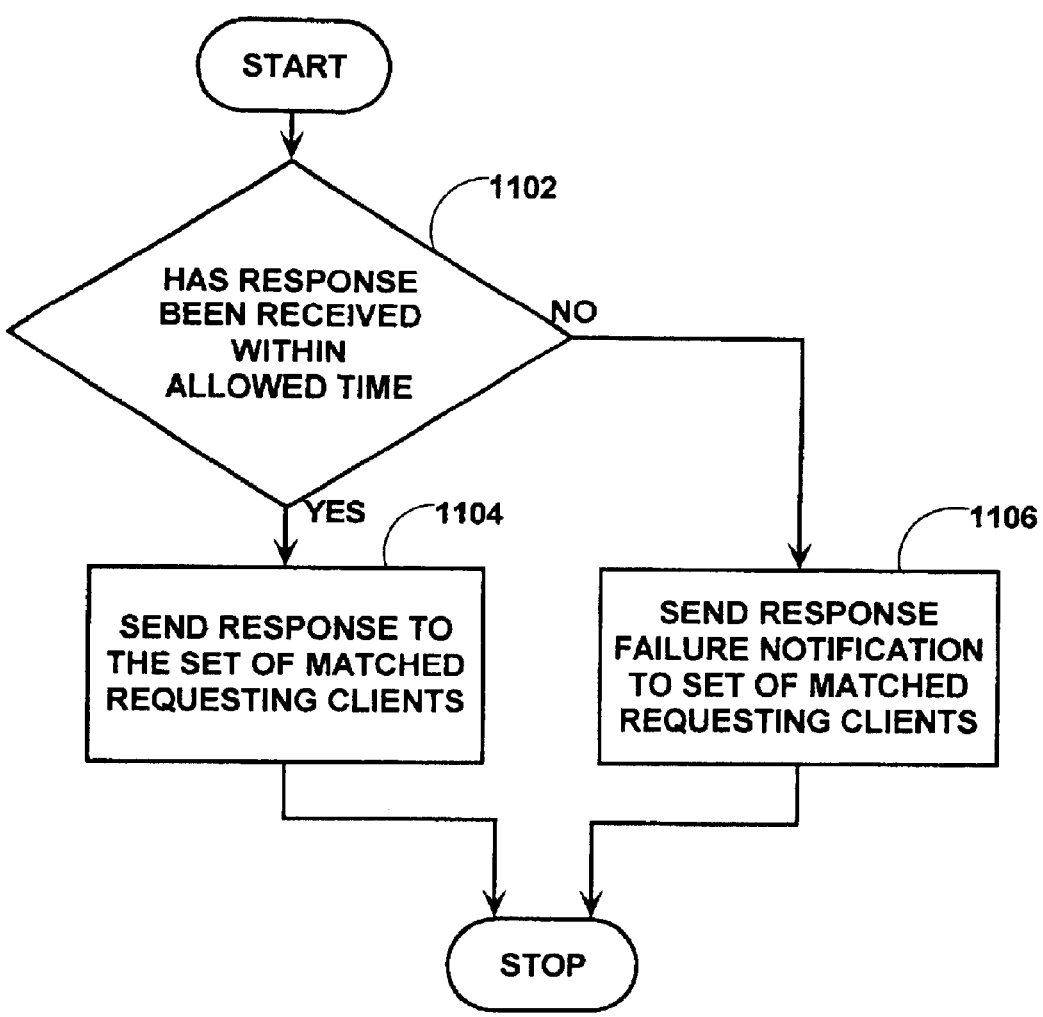
FIG. 11 is a flow diagram of process carried out by a software module according to an embodiment of the invention.

Referring to FIG. 11, a flow diagram 1100 of a process performed by a response dispatch manager 604E is shown. In process block 1102 it is determined if the response to the GET has been received within a predetermined time limit. If the response has not been received within the predetermined time limit, then the process continues with process block 1106. In process block 1106 notification of the failed response, e.g., in the form of an HTTP error message received in response to the get is sent by the response dispatch manager 604E to the response manager(s) 606B associated with the requesting client 608 or to each of a set of matched clients in the case that the GET corresponded to set of matched request in the cached request database. If a successful response to the GET is received, then the process 1100 continues with process block 1104. In process block 1104 the successful response, for example the World Wide Web (WWW) resource indicated in the URI of the GET is forwarded to the single response manager 606B or set of response managers 606B corresponding to a set of matched request in the cached request database 604B as the case may be.

Flow Diagram for a Process Performed by a Client Request Manager

Figure 12:
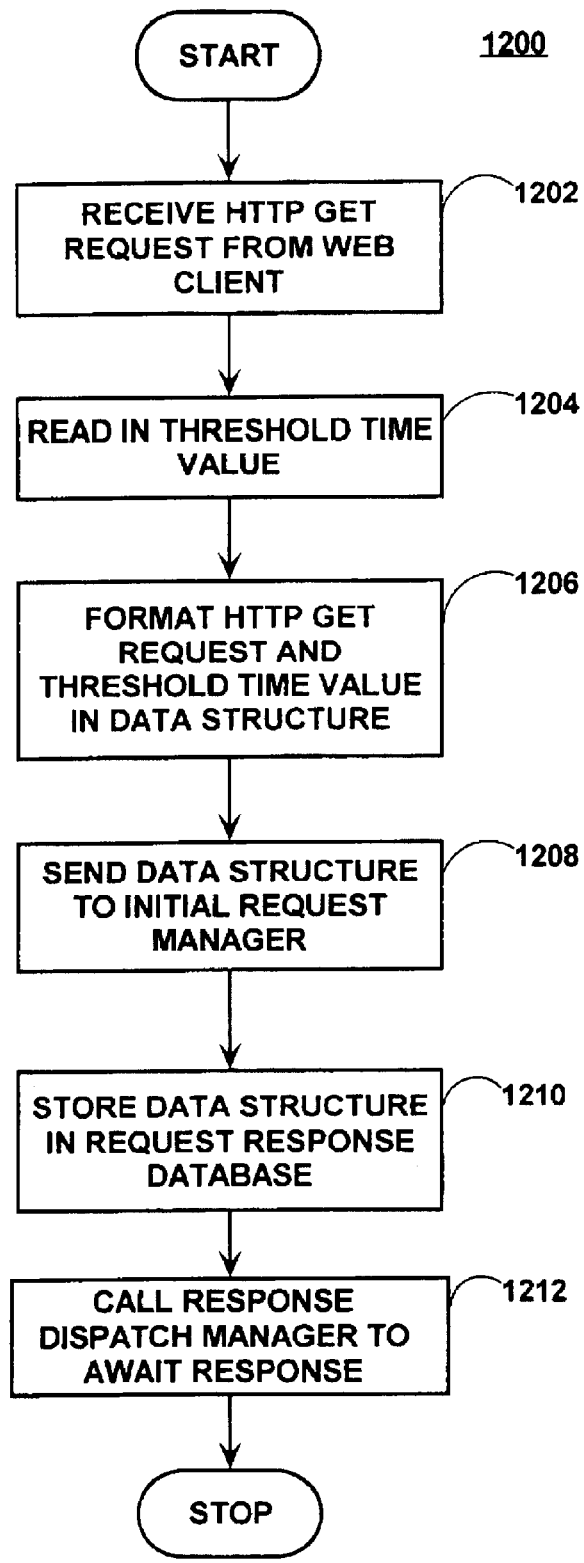
FIG. 12 is a flow diagram of process carried out by a software module according to an embodiment of the invention.

Referring to FIG. 12 a flow diagram 1200 of a process performed by a client side request manager 606A is shown. In process block 1202, an HTTP GET request is received from a web client 608 such as a web crawler, or a web browser. In process block 1204 a threshold time value is read in by the request manager 606A from stored data or from a user interface dialog box. In process block 1206 the HTTP GET request and the threshold time value are formatted into a data structure, e.g. SOAP code. In process block 1208 the data structure bearing the HTTP GET and threshold time value is sent to the initial request manager 604A module of the proxy server component 604. In process block 1210 the data structure is stored in the client side request response database 606C. In process block 1212 the response manager 606B is called to await the response.

Flow Diagram for a First Process Performed by a Response Manager

Figure 13:
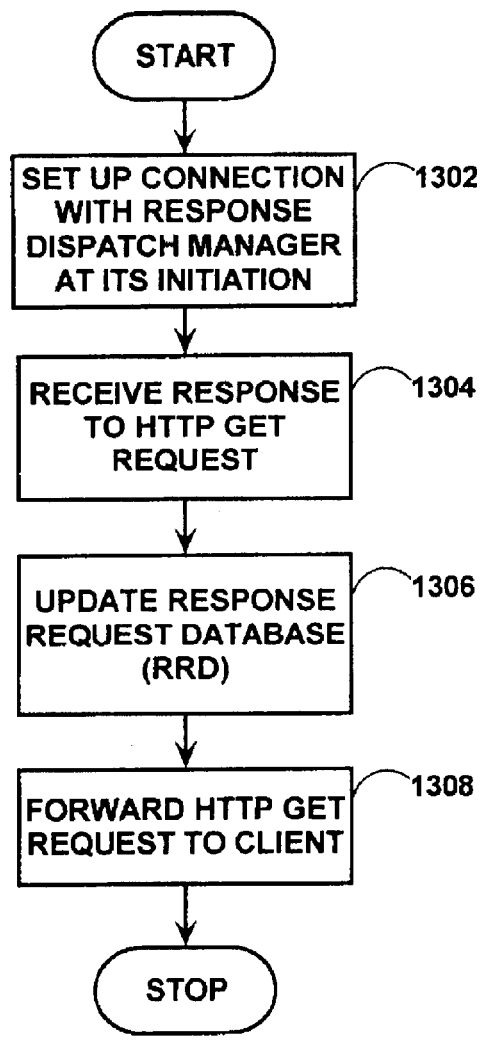
FIG. 13 is a flow diagram of process carried out by a software module according to an embodiment of the invention.

Referring to FIG. 13, a process 1300 performed by a client side response manager 606B is shown. In process block 1302, a connection is set up with the proxy server response dispatch manager 604E, at the initiation of the latter. In process block 1304 the response to the HTTP GET request is received. In process block 1306 the request response database 606C is updated to reflect the nature of the response. The response could be an HTTP error message or a transmission of the requested resource. Process block 1306 could be carried out based on the initial header portion of the response, and completed before the entire response is received. In process block 1308 the response to the HTTP GET request is forwarded to the web client 608.

Flow Diagram for a Second Process Performed by a Response Manager

Figure 14:
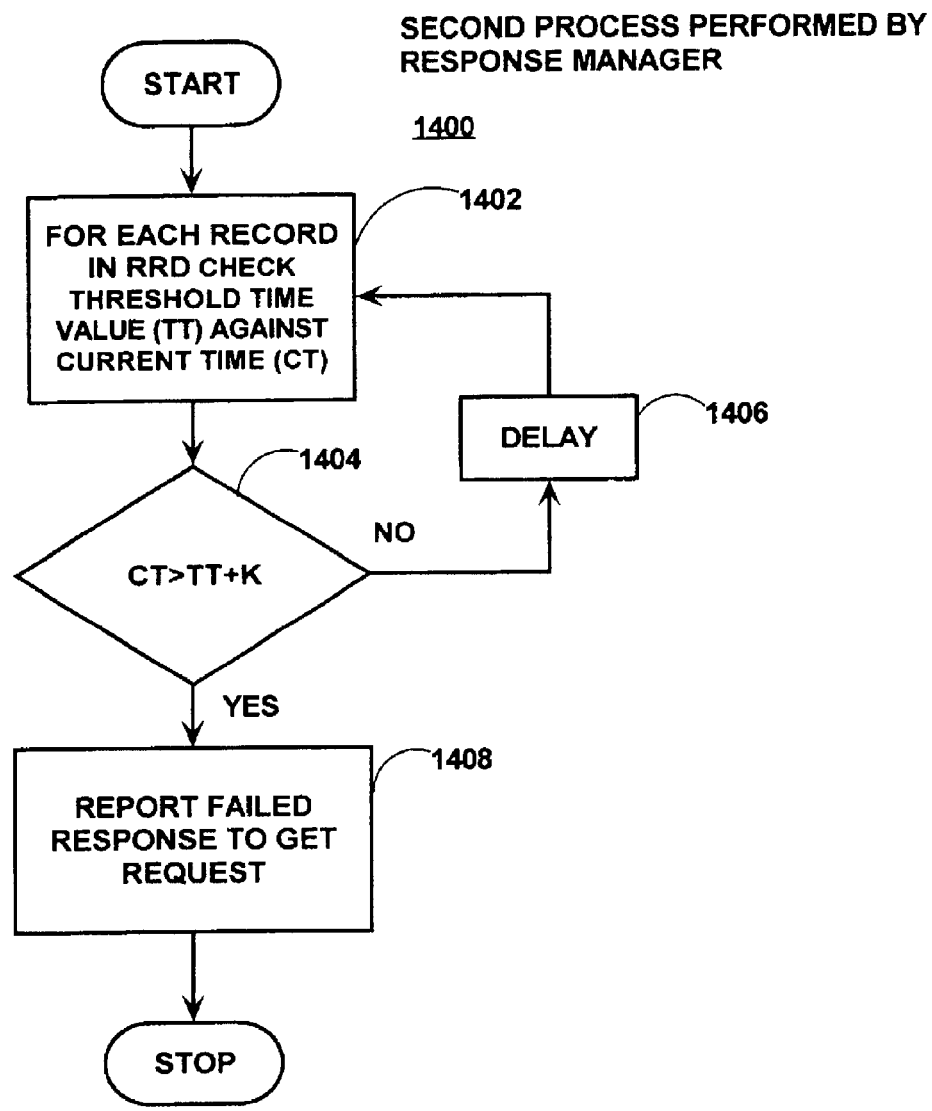
FIG. 14 is a flow diagram of a process carried out by a software module according to an embodiment of the invention.

Referring to FIG. 14, a flow diagram 1400 of second process performed by a client side response dispatch manager is shown. In process block 1402 for each record stored in the clients side request response database 606C the threshold time value is checked against the current time value. The outcome of decision block 1404 depends on whether the current time exceeds the threshold time value plus a time interval K. The time interval allows for processing time for the enhanced proxy server 604 and the client side component 606. The value of K may be selected based on the amount of time that will be expected to elapse between when the threshold time value exceeds the current time and when the response request databases 606C is updated in process block 1304, plus a safety margin. If the current time exceeds the threshold time value plus K, then in process block 1408, the failure of the GET request is reported to the client application 608. If not the process loops back through a delay 1406 to process block 1402.

Although the embodiments of the invention described with reference to FIGS. 5–14, an have been discussed in connection with a proxy server/gateway between an Intranet and the Internet, the embodiments can applied to other network nodes, for example dial up servers, or network routers.

Discussion of Hardware and Software Implementation Options

The present invention, as would be known to one of ordinary skill in the art could be produced in hardware or software, or in a combination of hardware and software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in art.

According to the inventive principles as disclosed in connection with the preferred embodiments, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network, that allow a computer to read such computer readable information.

The term file server as used in the present application can mean a single computer from which clients can request and receive resources (e.g. files) or a network of computers that performs the same functions.

What is claimed is:

1. A computer network comprising:
   a file server;
   a file server application installed on the file server;
   a client computer;
   a client application installed on the client computer;
   a proxy server application installed on the file server, the proxy server application communicatively coupled through a network as an intermediary between the client application and the file server application, the proxy server application programmatically operative to
   receive a download request for data from the client application,
   determine if a utilization load of the file server exceeds a predetermined threshold, and in response to the utilization load exceeding the predetermined threshold, calculating an estimated start-time to begin a download of the data requested from the file server to the client computer, and store the estimated start-time along with an identifier for the data requested, wherein the estimated start-time is based upon a number of outstanding bytes still to be downloaded from the file server and an available bandwidth of the network;
   send a client side applet to the client computer in response to the data requested, and
   send the client side applet status information regarding the data requested for download from the file server, including the estimated start-time to download the data requested, and an estimated time to complete the download of the data requested, and a count of other pending download requests received by the file server.

2. A computer implemented method for managing requests for resources received at a file server using a proxy server application, the method comprising:
   receiving a download request for an information resource located on a file server from a client application, wherein the request is received through a proxy server application acting as a communications intermediary between the file server and the client application, and wherein the file server and the client application are communicatively coupled over a network;
   recording information relative to the download request in a database;
   sending an applet to the client computer;
   determining if a utilization load of the file server exceeds a predetermined threshold, and in response to the utilization load exceeding the predetermined threshold, calculating an estimated start-time to begin a download of the information resource requested from the file server to the client computer, and store the estimated start-time along with an identifier for the information resource requested in the database, wherein the estimated start-time is based upon a number of outstanding bytes still to be downloaded from the file server and an available bandwidth of the network; and
   sending status information for the information resource requested to the applet including the estimated start-time to download the information resource along with an estimated time to complete the download of the information resource.

3. The computer implemented method of claim 2, further comprising:
   receiving a status request from the applet by the proxy server application,
   re-determining if the utilization load of the file server exceeds the predetermined threshold, and in response to the utilization load exceeding the predetermined threshold, re-calculating the estimated start-time to begin the download of the information resource from the file server to the client computer; and
   sending updated status information for the information resource requested to the applet.

4. The computer implemented method of claim 2, further comprising:
   accessing a file size corresponding to the requested information resource; and
   comparing the file size to a limit value and in response to the file size being larger than the limit value, recalculating the estimated start-time based upon the file size after any other pending download requests are complete.

5. The computer implemented method of claim 1, further comprising:
   comparing a requested file type of a file corresponding to the information resource requested to a list of one or more file types and in response to the requested file type matching at least one of the file types on the list, calculating the estimated start-time based upon the requested file type which is different than the estimated start-time for a requested file type not matching at least one of the file types on the list.

6. The computer implemented method of claim 1, further comprising:
   receiving a status request from the applet by the proxy server application; and
   checking if the utilization of the file server is below the predetermined threshold after receiving the status request from the applet and in response to the utilization load of the file server being below the predetermined threshold, begin downloading the requested resource from the file server to the client.

7. A computer readable medium containing programming instructions for managing request for resources received at a file server comprising programming instructions for:
   receiving a download request for an information resource located on a file server from a client application, wherein the request is received through a proxy server application acting as a communications intermediary between the file server and the client application, and wherein the file server and the client application are communicatively coupled over a network;
   recording information relative to the download request in a database;
   sending an applet to the client computer;
   determining if a utilization load of the file server exceeds a predetermined threshold, and in response to the utilization load exceeding the predetermined threshold, calculating an estimated start-time to begin a download of the information resource requested from the file server to the client computer, and store the estimated start-time along with an identifier for the information resource requested in the database, wherein th estimated start-time is based upon a number of outstanding bytes still to be downloaded from the file server and an available bandwidth of the network; and
   sending status information for the information resource requested to the applet including the estimated start-time to download the information resource along with an estimated time to complete the download of the information resource.

8. The computer readable medium of claim 7, further comprising the instructions for:

receiving a status request from the applet by the proxy server application, re-determining if the utilization load of the file server exceeds the predetermined threshold, and in response to the utilization load exceeding the predetermined threshold, re-calculating the estimated start-time to begin the download of the information resource from the file server to the client computer; and sending updated status information for the information resource requested to the applet.

9. The computer readable medium of claim 7, further comprising the instructions for:

accessing a file size corresponding to the requested information resource; and comparing the file size to a limit value and in response to the file size being larger than the limit value, re-calculating the estimated start-time based upon the file size after any other pending download requests are complete.

10. The computer readable medium of claim 7, further comprising the instructions for:

comparing a requested file type of a file corresponding to the information resource requested to a list of one or more file types and in response to the requested file type matching at least one of the file types on the list, calculating the estimated start-time based upon the requested file type which is different than the estimated start-time for a requested file type not matching at least one of the file types on the list.

11. The computer readable medium of claim 7, further comprising the instructions for:

receiving a status request from the applet by the proxy server application; and checking if the utilization of the file server is below the predetermined threshold after receiving the status request from the applet and in response to the utilization load of the file server being below the predetermined threshold, begin downloading the requested resource from the file server to the client.

12. A proxy server comprising:

an internet network connected to at least one file server;

an intranet network connected to at least one client running a client application;

a proxy server application acting as a communications intermediary between the file server and the client application, the proxy server application including:

a cached request database;

an initial request manager which receives a download request with a threshold time from the client application running on the client for data on the file server, wherein the initial request manager records the threshold time and a request identifier in the cached request database along with a status identifier;

a schedule manager which for each download request received, compares the download request with previous request identifiers stored in the cached request database and in response to a match found in the cached database, changing the associated status identifier to indicate a match was found, wherein the schedule manager periodically compares a current proxy server application time to the threshold time recorded in the cached request database, and in response to the current proxy server time exceeding the threshold time, the status identifier is changed to the download request; and a request manager which periodically compares the status identifier in the cached request database, and in response to the status identifier matching the download request, downloading the requested data file from the file server to the client.

* * * * *